United States Patent [19]

Behensky et al.

[11] Patent Number: 5,005,148
[45] Date of Patent: Apr. 2, 1991

[54] DRIVING SIMULATOR WITH MOVING PAINTED DASHBOARD

[75] Inventors: Max L. Behensky, Hayward; Rick L. Moncrief, Santa Clara; Jed Margolin, San Jose; Stephanie J. Mott, Sunnyvale, all of Calif.

[73] Assignee: Atari Games Corporation, Milpitas, Calif.

[21] Appl. No.: 296,553

[22] Filed: Jan. 12, 1989

[51] Int. Cl.$^5$ .............................................. G09B 9/04
[52] U.S. Cl. ..................................... 364/578; 434/62; 434/69
[58] Field of Search .................. 364/578, 521, 522; 434/30, 37, 38, 47, 62, 69

[56] References Cited

U.S. PATENT DOCUMENTS

| | | | |
|---|---|---|---|
| 4,196,528 | 4/1980 | Foerst | 364/578 X |
| 4,209,832 | 6/1980 | Gilham et al. | 364/521 |
| 4,383,827 | 5/1983 | Foerst | 434/69 |
| 4,631,691 | 12/1986 | Pica | 364/521 |
| 4,660,157 | 4/1987 | Beckwith et al. | 364/522 |

Primary Examiner—Thomas G. Black
Attorney, Agent, or Firm—Ronald C. Fish

[57] ABSTRACT

A driving simulator for a video game is disclosed. It includes an apparatus and method for moving the visual display of the dashboard relative to the visual display of the outside scene by horizontal scrolling when the car is being turned. A model processor calculates an acceleration vector acting on the drivers head based upon conditions affecting the vehicle such as acceleration during turns. This acceleration vector is scaled and converted to an integer from floating point. The integer value is then digitally low pass filtered to eliminate the graininess of the discrete nature of the process. Finally two routines are called which use the integer data to calculate where the dash, mirror and cab sidepost are to be displayed in the scene of the simulated environment displayed to the driver. Another routine is then called to load the appropriate data into the hardware which performs the scrolling.

16 Claims, 9 Drawing Sheets

COMMUNICATION.C    C   CODE

MODEL PROCESSOR CODE TO CALCULATE ACCELERATION VECTOR

```
/*        OUT68K.acc[XCOMP]=F[XCOMP]*massinv*2;*/
   →      OUT68K.acc[YCOMP]=F[YCOMP]*massinv*3.5;
/*        OUT68K.acc[ZCOMP]=F[ZCOMP]*massinv*2; */
```

FIG. 8

COMMUNICATION.C    68000   MASTER   PROCESSOR   CODE

```
communication()
{
            .
            .
            .

dashxvar += ((short)(OUT68K.acc[YCOMP])*(short)persyspk) -
            dashxvar;
    dashyvar += (((short)(-OUT68K.acc[ZCOMP])*(short)perszspk) -
            dashyvar)>>2;
    dashx = dashxvar>>8;
    dashy = dashyvar>>8;
            .
            .
            .
```

FIG. 10

68_ GSP.H

```
struct miscdata{
        short uvs[3][3];
        short mph;
        short rpm;
     → short dashx;
        short dashy;
        short amp;
        short tmp;
        short oil;
        short gas;
```

COMMUNICATION STRUCTURE SHARED
CODE BETWEEN 68000 AND DISPLAY
PROCESSOR TO PASS DATA

FIG. 11

MODEL.H          C   CODE

COMMUNICATION STRUCTURE FOR COMMUNICATION BETWEEN
MODEL PROCESSOR AND 68000

```c
struct outstruct{
        short caruvs[3][3];        /* Unit vectors for car */
        int xt;                    /* X, Y, and Z translations */ int yt;                    /* 1.0 foot = S4SCALE */
        int zt;
        short xv;                  /* X, Y, and Z velocities */
        short yv;                  /* S4SCALE/TICKTIME */
        short zv;
        short rollv;               /* roll,pitch and yaw */
        short pitchv;              /* velocities, sdeg/TICKTIME */
        short yawv;
        short rwmph;               /* Speed, 1.0 mph = MPHSCALE */
        short rpm;
        short shifttorque;         /* Torque through transmission */
        short gearslip[6];         /* Which gear speeds are matched */
        short acc[3];              /* X, Y, Z acceleration */
        short swtorque;            /* Steering wheel torque */
        short swdamp;              /* Steering wheel damping */
        short swfrict;             /* Steering wheel friction */
        short swsfxcode;           /* Steering wheel efx code */
        short fscreech;
        short rscreech;
        short crashflag;
        short cursect;             /* current road section number */
        short ftroadcode;          /* front tire road surface code */
        short rtroadcode;          /* rear tire road surface code */
        short initcomplete;        /* flag that initialization is fini*/
        short thumpflag;           /* flag that we should thump */
        short amp;
        short tmp;
        short oil;
        short gas;
        short com1;
        short com2;
        short com3;
        short com4;
        short com5;
        short com6;
        char _str[40];             /* String to send to 68000 */
        struct mathbugtyp mathbug;
};
```

FIG. 9

68GSP.H   DISPLAY PROCESSOR CODE

```
#include "68_gsp.h"
            .
            .
            .
extern struct miscdata *cur_buf;
            .
            .
short dashx,dashy;
interiors()
{
            .
            .
dashx= cur_buf->dashx;
dashy= -cur_buf->dashy;
            .
            .
xy_hex(200,150,dashy);*/
img= (struct blit_header *)intptr->start;/* DISPLAY THE REARVIEW
SIDEPOST */
do_blit(img,intptr->hofs+dashx,intptr->vofs+384-128,0,COLORT);
intptr++;
```

FIG. 12

MOUNTAIN.C   DISPLAY   PROCESSOR   CODE

```
        short   dpy_off,cur_dashx,cur_dashy
        struct  miscdata *cur_buf;
                .
                .
norollhorizon()
{
                .
                .
        /* set up current buffers dash x pos for next display */
            cur_dashx= 114 - cur_buf->dashx ;

/* set up current buffers dash y position for next display */
            cur_dashy= cur_buf->dashy;
```

FIG. 13

DPOLY.ASM DISPLAY PROCESSOR CODE
---

```
        move    >OF,A0              /* set preset nibble to all 1's
                .                      to initialize
                .
                .

calla   _norollhorizon
                .
                .
                .

move    A0,@DPYTAP,0        ; set tap point to all 0's
                .
                .
                .

move    @int_cnt,A0,1       ; increment interrupt counter
                .
                .
                .

dash_interrupt:
                .
                .
  ┌150    .
  │ move    @dash_x,A0          ; get previous buffer's x position
  │ srl     4,A0                ;divide by 16(how many 16 line pieces)
  └ andi    >1F,A0              ; only set the 1s bits
 ─►move    A0, @DPYTAP,0        ; set the tap point (coarse hor. scroll)

move    @dash_x,A0          ; set up jed's special (0-15) shift
  ┌ move    A0,@JSHIFTL         ;\write preset nibble (fine hor. scroll)
 ─►└ move    A0,@JSHIFTH         ;/

┌ move    @_cur_dashx,@dash_x  ; update for next shift
  │ move    @_cur_dashy,@dash_y  ; update for next shift
  └152
```

FIG. 14

DRIVING SIMULATOR WITH MOVING PAINTED DASHBOARD

BACKGROUND OF THE INVENTION

The invention pertains to the field of video driving simulators, and, more particularly, to the field of driving games having moving video displayed dashboards which simulate the perspective seen by the driver when cornering an actual vehicle.

One of the important visual cues to a driver of an actual vehicle is the relative movement between the dashboard and the outside scene when cornering the vehicle. This relative movement results from the fact that as the vehicle corners, the inertia of the driver's head causes the driver's head to move inside the vehicle from its pre-cornering position. This movement is caused by the tendency of the driver's head to continue motion in a straight line and by the centrifugal force of the turn. The resulting view before the driver's eyes is an apparent relative movement between the dashboard and the outside scene. This important visual feedback cue tends to verify for the driver that the car is in fact responding to the turning command.

Heretofore, as far as is known to the Applicants, no video or driving simulator has moved the dash of the simulated vehicle relative to the outside scene on the video display to provide the aforementioned visual cue. Therefore, a need has arisen for a driving simulator which provides this visual cue.

SUMMARY OF THE INVENTION

According to the teachings of the invention, there is disclosed an apparatus and method for scrolling a dashboard in accordance with simulated conditions affecting a simulated vehicle to simulate the perspective seen by a driver in response acceleration forces acting on the driver's head and neck.

DETAILED DESCRIPTION OF THE PREFERRED EMBODIMENT

Figure 1:
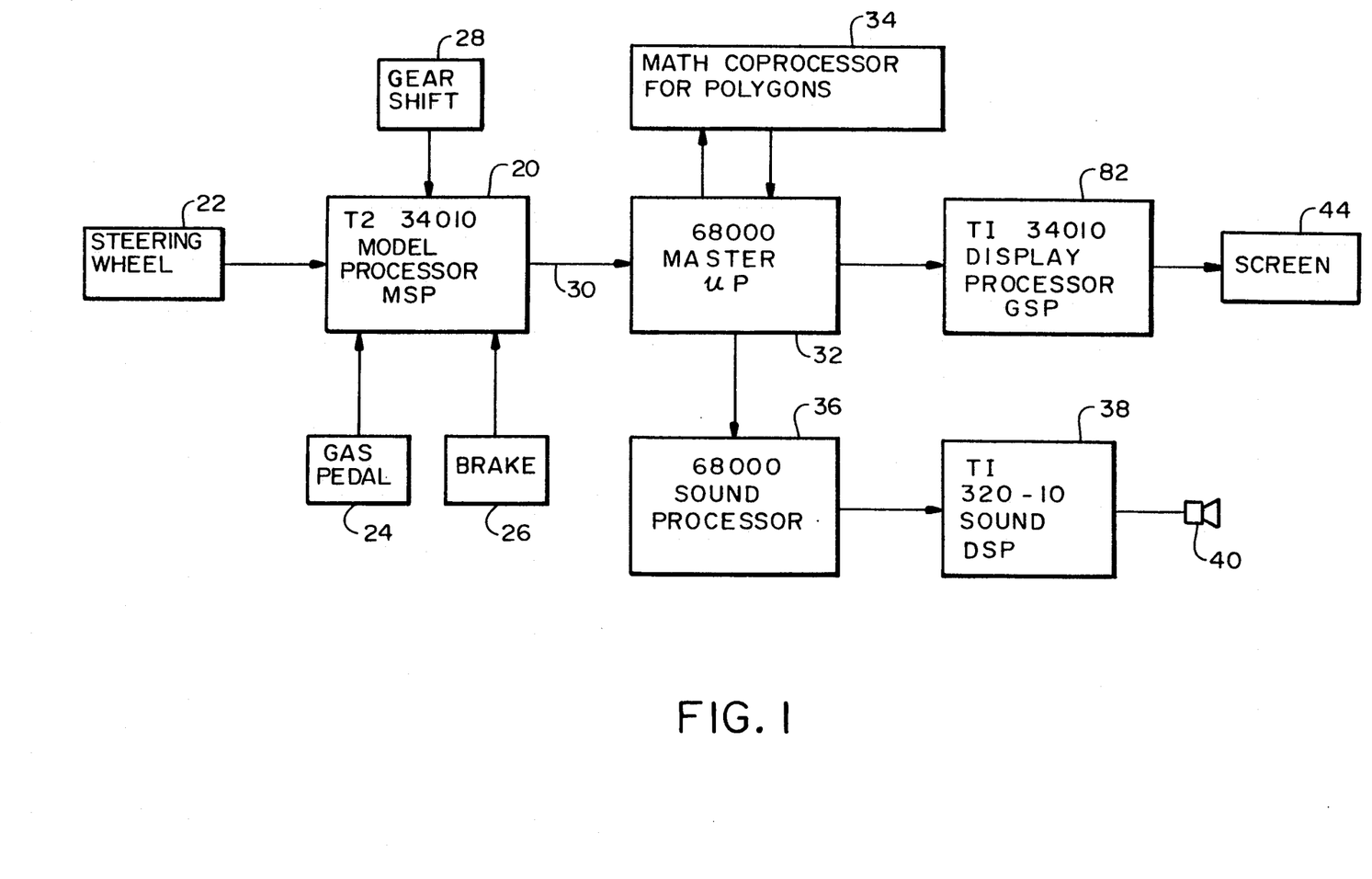
FIG. 1 is a block diagram of the hardware of a driving simulator.

Referring to FIG. 1, there is shown an overall block diagram of the driving simulator hardware. Not all of the apparatus shown in FIG. 1 is involved in implementing the teachings of the invention, but the overall system is shown for completeness. The driving simulator illustrated in FIG. 1 uses a model processor 20 to calculate acceleration vectors acting on the simulated vehicle in accordance with driving conditions. User input is received regarding the desired movements of the vehicle from a steering wheel 22, a gas pedal 24, a brake 26 and a gear shift 28. The model processor receives these inputs and uses them as parameters in the solution of a set of simultaneous equations which implement a model of how a real vehicle would react to such user inputs in the real world. The solution of these equations represents an acceleration vector acting on the vehicle. This acceleration vector is output on bus 30 to a master processor 32.

The master processor serves as the system coordinator in coordinating communication between the various processors and other elements of the system. For example, the master processor 32 communicates with a math coprocessor 34 and a sound processor 36. The math coprocessor 34 computes a display list for polygons which comprise the visual scene which will be presented to the driver as a visual cue as to how the vehicle is moving through the universe stored in memory of the simulator. Note that the memory for the various processors in the system is now shown, but obviously all of the processors in the system need access to memory to store and retrieve data involved in their various operations. The sound processor 36 digitally generates sounds such as screeching tires, wind sound and motor sounds to provide the appropriate audible cues to the driver of the simulated vehicle based upon the current conditions affecting the vehicle. A sound processor 38 provides further sound processing and conversion to analog output for the loudspeaker 40.

The master processor 32 communicates the display list for the polygons in the outside scene to a display processor 42. The display processor performs the appropriate processing to cause a video display on a screen 44 of the position and actions of the simulated vehicle in the universe stored in the memory of the system of FIG. 1. A typical scene which will be presented to the driver of the simulated vehicle on screen 44 is as shown in FIG. 2.

Figure 2:
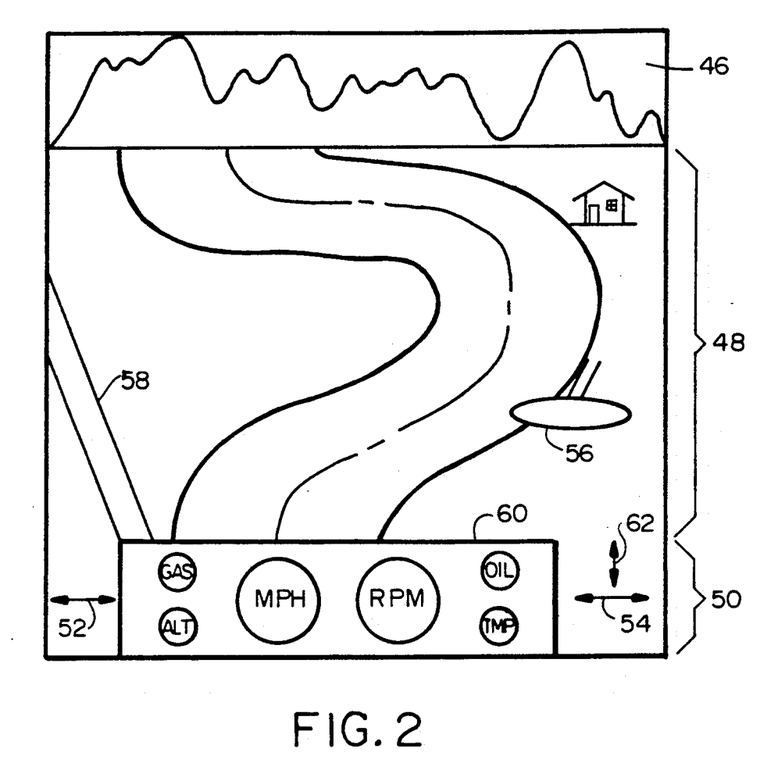
FIG. 2 is a view of a typical scene seen by an operator of the simulated vehicle in the simulator of FIG. 1.

Referring to FIG. 2, the scene which is presented to the driver is comprised of basically three segments. The horizon segment 46 moves very little if at all because of its large distance from the driver and the vehicle as it moves through the universe. The middle segment of the screen indicated at 48 is where most of the apparent movement of the vehicle through the simulated universe is depicted. Finally, the dashboard segment of the screen, shown at 50, does move, but in the preferred embodiment is limited to horizontal scrolling back and forth along the axis represented by arrows 52 and 54 in response to cornering movements of the car. There is a simulated rear view mirror 56 and a simulated sidepost 58 which are connected to the car and which appear in the middle segment 48. These items 56 and 58 are moved simultaneously with the movement of the dash to provide visual cornering cues. In alternative embodiments, the simulated dashboard 60 on the video display and the cornerpost 58 and rear view mirror 56 could also move in the vertical direction represented by the arrow 62 to simulate the apparent movement of the dashboard in a car as the driver,s head moves toward the front of the car or toward the rear of the car with acceleration and deceleration of the simulated vehicle.

Figure 3:
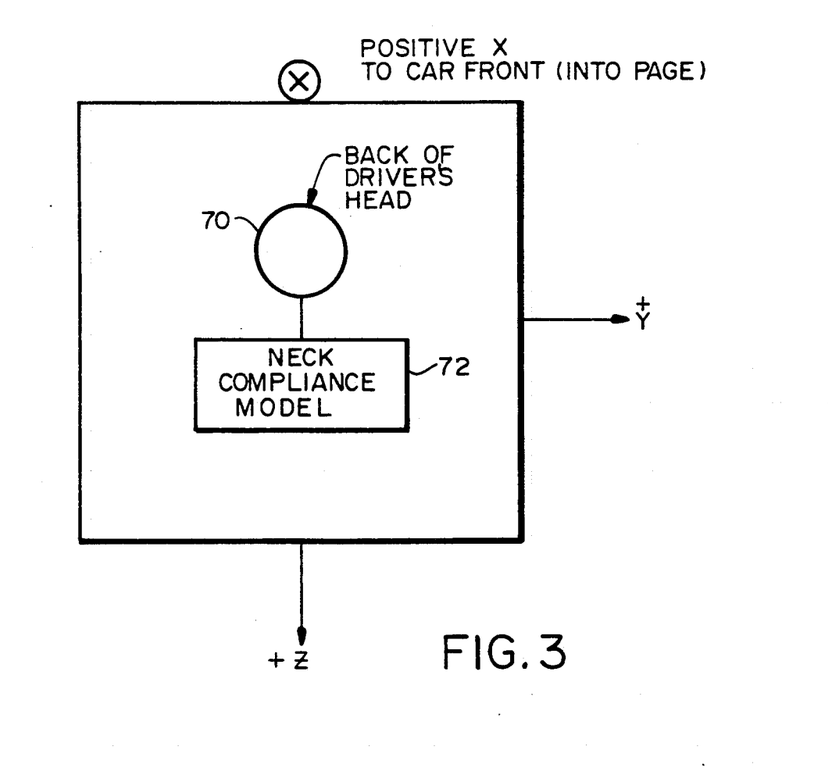
FIG. 3 is a model of the head and neck model used for calculating the perceived perspective change.

Referring to FIG. 3, there is shown a symbolic diagram of the relationship of the driver's head to the coordinating system used by the model processor to generate an acceleration vector. The driver's head is shown at 70 with a compliance model for the neck and body compliance of the driver's body shown symbolically at 72.

A coordinating system used by the model processor has the positive X axis toward the car front and extending into the page in the view shown in FIG. 3. The positive Y axis is to the right, while the positive Z axis is downward in the view shown in FIG. 3. Thus, the surface of the driver's head 70 seen in the view of FIG. 3 is the back of the driver's head and the driver's face faces forward toward the front of the car or into the page.

Simulated dash movement by horizontal scrolling in the display shown in FIG. 2 is used to simulate the perspective seen by the driver when the car corners or changes directions in the X-Y plane. For example, when the car turns to the right or to a more positive Y coordinate in the X-Y plane, the driver's head, because of inertia, tends to continue on the straight path the car was following before the turn was initiated. This causes the driver's head to move left or more negative in the Y direction relative to the framework of the car, which causes the apparent shifting of the dashboard, rear view mirror and sidepost in FIG. 2 toward the right. Similar but reversed situation applies for turns to the left. In alternative embodiments, the program may be adapted to cause vertical scrolling of the dashboard 60, the sidepost 58 and the rear view mirror 56 in the view shown in FIG. 2 to simulate acceleration and deceleration along the X axis in FIG. 3. This would correspond to movement of the driver's head back and forth along the X axis in response to these accelerations.

Figure 4:
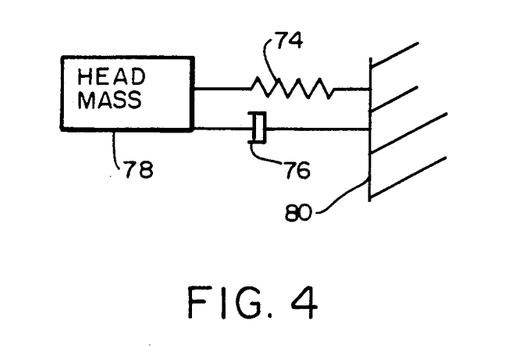
FIG. 4 is a mechanical model of the head and neck compliance model.

Referring to FIG. 4, there is shown a model of the mechanical system which represents the physical system shown in FIG. 3. The compliance model 72 is represented by a spring constant in a spring 74 while a dash pot 76 represents the damping of the system. The driver's head 70 is represented by head mass 78. The system is anchored to a moving platform 80. A turn of the vehicle is represented by movement of the moving platform 80. This movement is transmitted to the headmass through the spring 74 and dash pot 76 and results in movement of the headmass 78 in accordance with the spring constant of spring 74 as damped by the dashpot 76.

Figure 5:
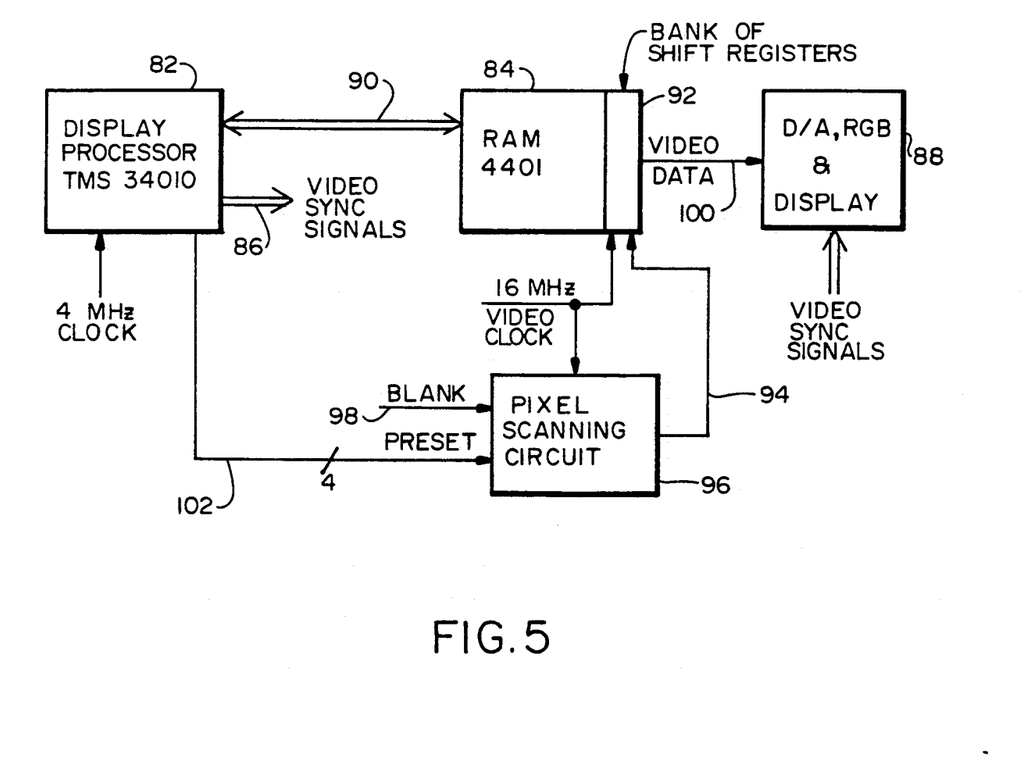
FIG. 5 is a hardware block diagram of the circuitry that supports horizontal scrolling of the dashboard.

Referring to FIG. 5, there is shown a block diagram of the apparatus which performs the horizontal scrolling of the dashboard, the rear view mirror and the sidepost. A display processor 82 running a program stored in random access memory 84 generates the appropriate data to cause the horizontal scrolling. The display processor 82 is a Texas Instruments TMS 34010 model video processor. This processor receives a 4 mHz clock signal and has an instruction set which includes instructions to cause horizontal scrolling with a step size of 16 pixels. The display processor generates video signals on a bus 86 to control a video display in a digital to analog converter and display circuit 88.

The random access memory 84 contains the pixel data which defines the horizon section 46, polygon section 48 as well as the dash section 50 including the rear view mirror 56 and the sidepost 58 of the display shown in FIG. 2. The display processor 82 manipulates this video data via a bus 90. The random access memory 84 is structured such that entire rafter lines of video data may be simultaneously shifted into a bank of shift registers 92. These shift registers are sequentially enabled by control signals on a bus 94 which are generated by a pixel scanning circuit 96. The pixel scanning circuit is essentially a counter and decoder arrangement which receives a 16 mHz video clock signal and a blank signal on line 98 which establishes the start time for the scan of each horizontal raster line. As the video clock signal causes the counter in pixel scanning circuit 96 to count up, different selective signals on bus 94 are generated which cause the appropriate video data for the horizontal line being scanned to be output on the video data bus 100 to the display circuitry 88. There the video data is converted to analog signals in RGB format and display.

Horizontal scrolling with one pixel step sizes is implemented through the use of the preset signal on bus 102. This signal is comprised of a four bit nibble calculated by the display processor 82 in a manner which will be described further below.

Figure 6:
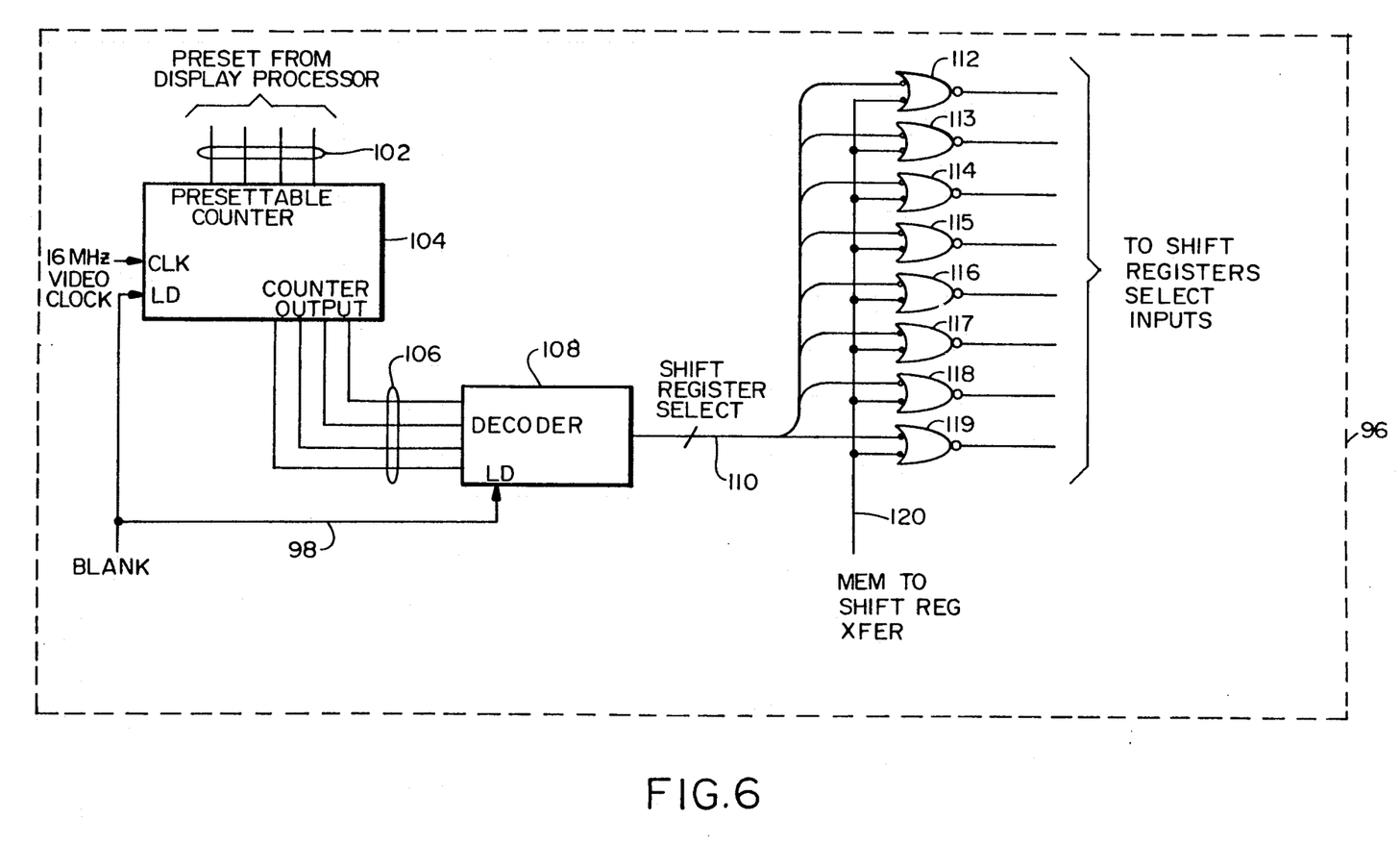
FIG. 6 is a more detailed hardware block diagram of the circuitry that implements horizontal scrolling of the dashboard.

Referring to FIG. 6, there is shown a more detailed circuit diagram for the pixel scanning circuit 96 in FIG. 5. A presetable counter 104 receives the preset nibble on bus 102. This preset nibble establishes the count from which the counter starts. The blank signal on line 98 is coupled to the lode input of the counter 104, and the 16 mHz video clock signal is coupled to the clock input of the counter 104.

When the blank signal is activated, the count established by the data on bus 102 is loaded into the counter and counting starts in synchronization with the pulses arriving at the clock input. The counter has a four bit output which is coupled to a bus 106 which in turn is coupled to the inputs of.a decoder 108. This decoder has a lode input which is coupled to the blank signal on line 98. When the blank signal is activated, the counter output on bus 106 is decoded by the decoder 108 and causes activation of one of the multiple shift register select lines on output bus 110. Each of these shift register select lines is coupled to one of a plurality of inverted input norgates 112 through 119. The other input of each gate is coupled to a signal on line 120 called memory-to-shift-register-transfer. The outputs of these gates 112 through 119 are coupled to individual enabled inputs of individual shift registers in the bank of shift registers represented by block 92 in FIG. 5. Thus, as the counter 104 counts, the decoder 108 sequentially selects different ones of the various shift registers in the bank of shift registers to cause the appropriate video data to be displayed for the raster scan line currently being scanned. Each shift register has its own count which corresponds to the activation to one of the lines on bus 110. The signal on the line 120 acts as a gating signal to pass the activated signal on bus 110 through to the enable input of the selected shift register. This signal on line 120 is activated at the time that a memory to shift register load event is supposed to occur to load a new line of video data into the bank of shift registers.

By changing the data on the preset bus 102, the first shift register that is enabled through the action of the decoder 108 can be altered which causes the left edge of the dashboard 60 in FIG. 2 to appear at different positions along the axis represented by the arrows 52 and 54 in FIG. 2. The arrangements of the shift registers in the bank of shift registers 92 in FIG. 5 is such that changing the data on the preset line 102 causes horizontal scrolling of the dashboard with one pixel resolution. The preset data on bus 102 is essentially a "fine tuning" control while the display processor 82 provides the "coarse tuning" control. That is, horizontal scrolling of the dash is achieved with a 16 pixel resolution by loading a register called DPYTAP in the display processor 82 with a five bit number that defines the desired horizontal position of the dashboard within a 16 pixel resolution. This represents the coarse position of the dash. The fine position of the dash is established by setting the appropriate preset number on bus 102 in FIG. 6. This number determines the fine position of the dash board as somewhere within the 16 pixel interval defined by the coarse tuning number in the DPYTAP register within the display processor.

Figure 7:
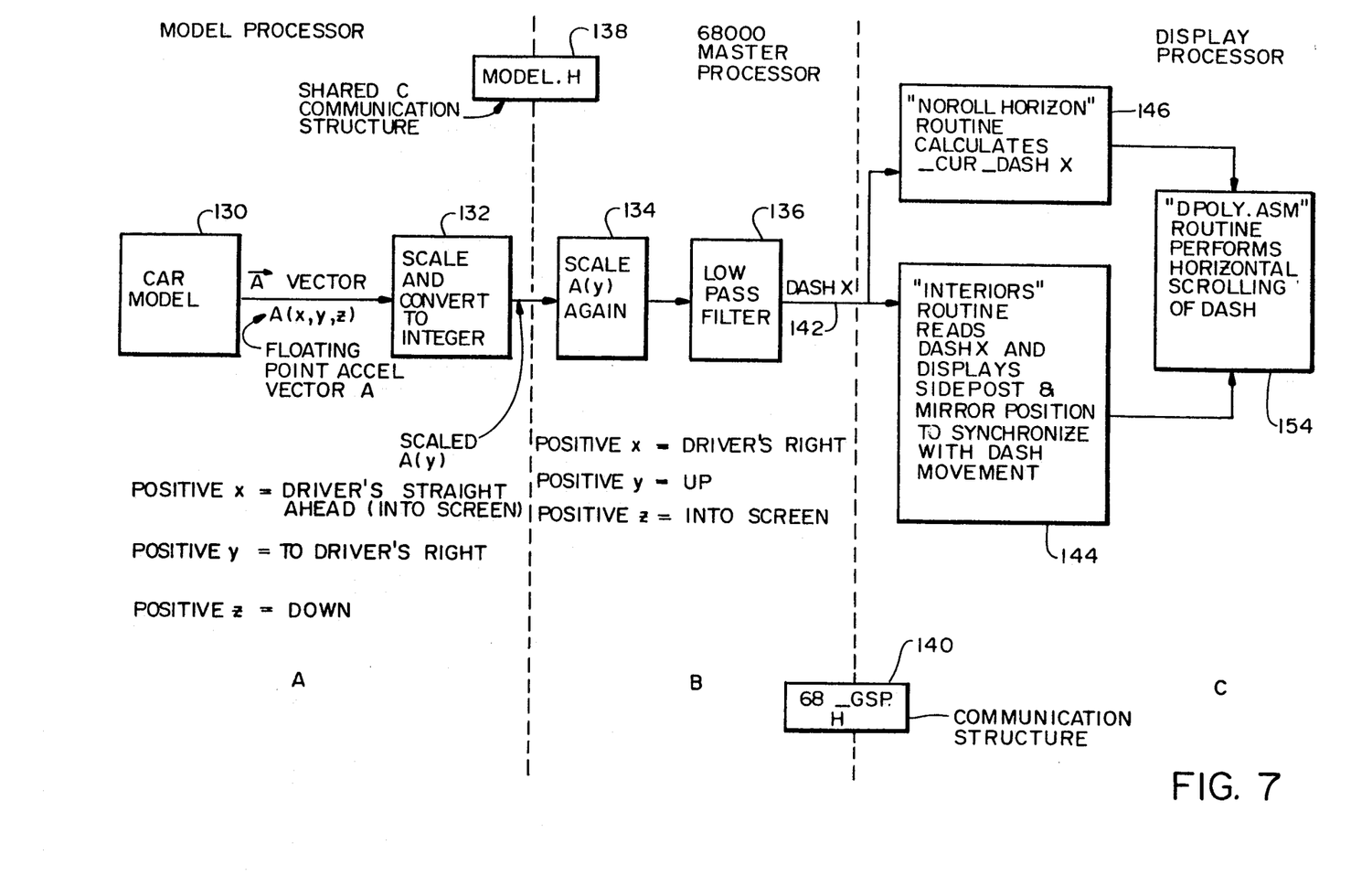
FIG. 7 is a software flow chart showing the sequence of operations that occurs in implementing the horizontal scrolling of the dashboard.
Figure 8:
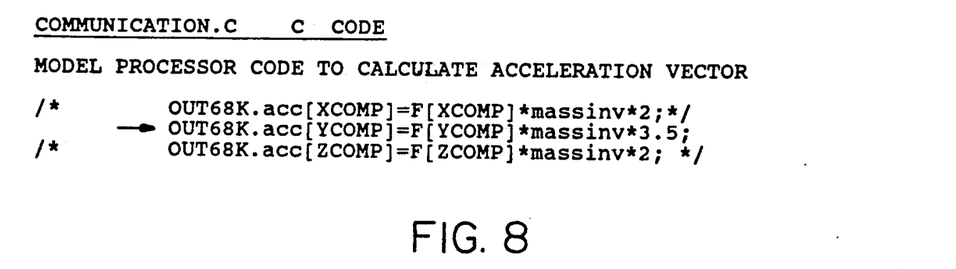
FIG. 8 is the high level C language description

Referring to FIG. 7 there is shown in symbolic form a flowchart of the processing performed by the three processors to implement the horizontal scrolling of the dashboard, rear view mirror and sidepost according to the teachings of the invention. Block 130 represents the system of equations which models the response of the car to driver inputs. The particular model used for the car,s response is not critical to the invention and will not be further described herein. Basically the model processor 20 in FIG. 1 receives inputs from the steering wheel 22, gear shift 28, gas pedal 24 and brake pedal 26 and converts these driver-controlled inputs to parameters. These parameters are then substituted into the model equations to determine the response of the car to those driver inputs. This results in the calculation of an acceleration vector A (x,y,z) which represents the acceleration of the car in response to the driver inputs. This acceleration vector is a floating point number represented by x, y and z components in the coordinate system defined in Section A of FIG. 7. This acceleration vector is then scaled and converted to an integer in an operation defined by block 132 in Section A of FIG. 7. The purpose of the scaling is to implement the spring constant represented by spring 74 in FIG. 4.

Referring to FIG. 7, there is shown the actual code in the high level language C which computes the acceleration vector x, y and z components. The acceleration vector is calculated by multiplying the force vector components in each of the x, y and z directions x the inverse of the mass representing the head of the driver. This is done because force = mass x acceleration and it is faster to multiply in a computer than to divide the force by the mass of the driver's head. Therefore the force multiplied by the inverse of the mass represents the acceleration of the driver's head. Note that in the preferred embodiment, the x and z components are commented out of the program listing so that only the y component is currently being used. In alternative embodiments, however, the x and z components may also be used with additional hardware to support the scrolling necessary to represent these changed perspectives.

Figure 9:
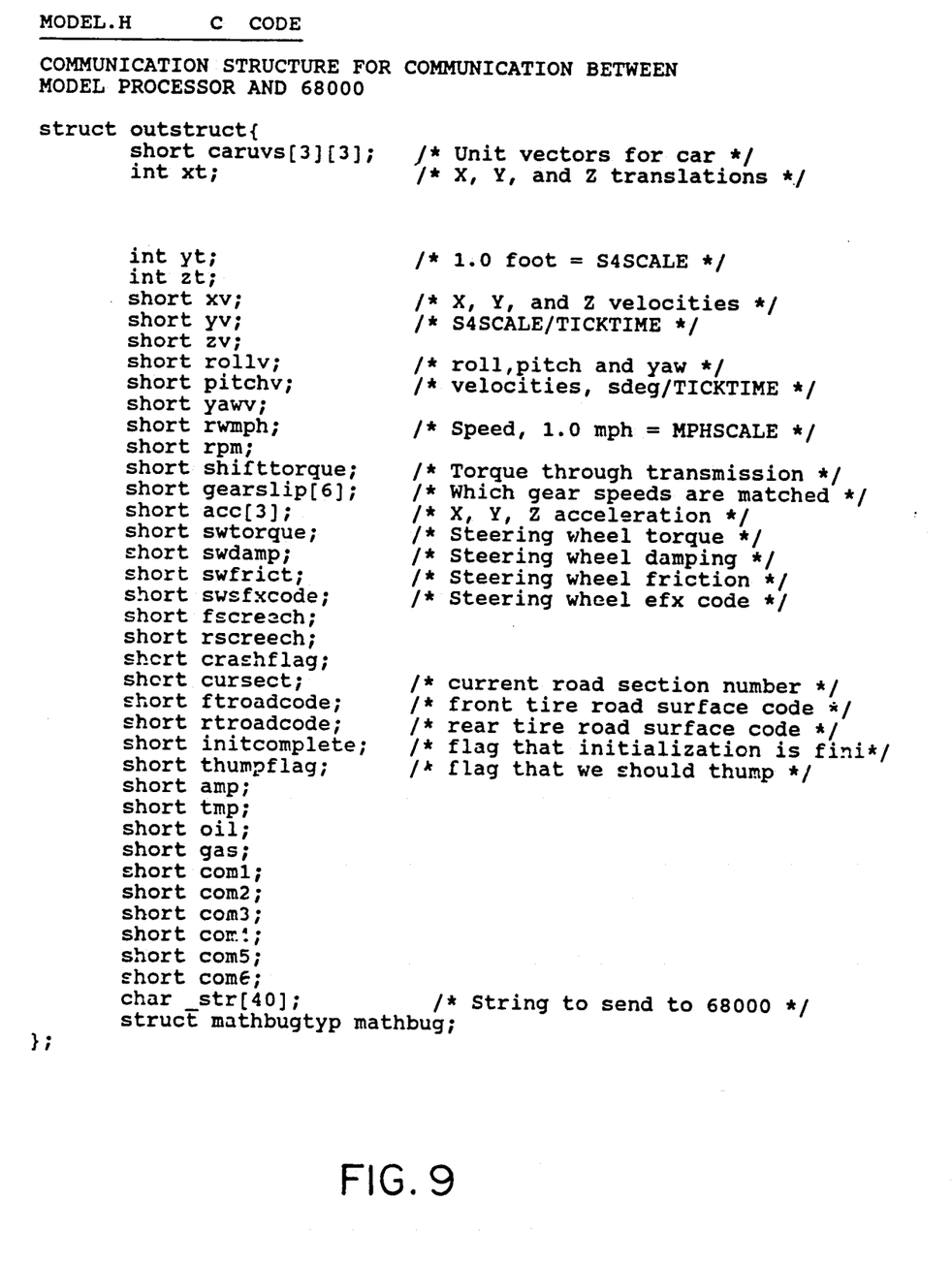

Referring to FIG. 9 there is shown the high level C language communication structure for communication of data between the model processor 20 in FIG. 1 and the 68,000 master processor 32 in FIG. 1. Communications between processors and the structure shown in FIG. 1 is done by virtue of overlapped memory mapping. The code shown in FIG. 9 essentially defines the structure of a portion of the memory in the sense of defining what a data record containing multiple fields. The definitions contained in the structure of FIG. 9 define what the data in each field represents.

Figure 10:
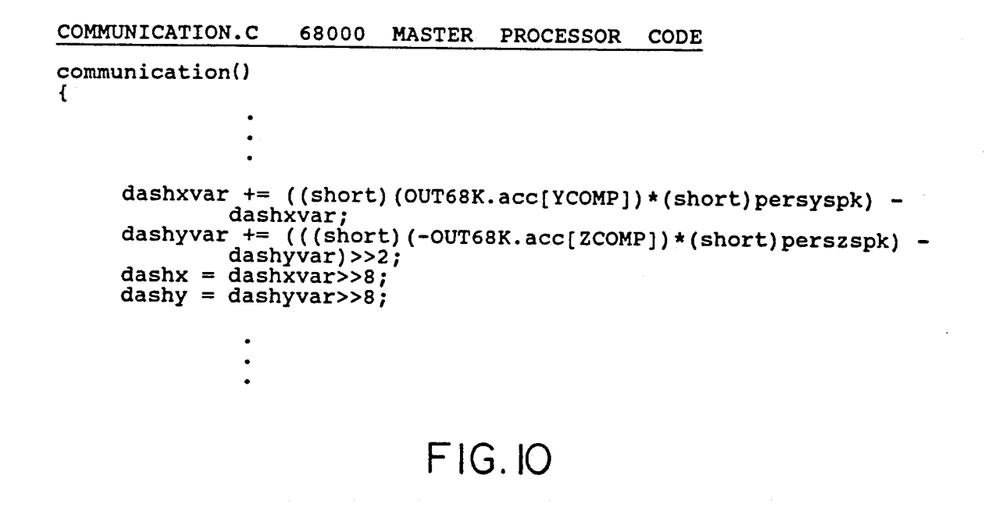

Referring to FIG. 10, there is shown the C language code which is run by the 68,000 to process the acceleration vector input data from the model processor. The purpose of the code in FIG. 10 is to scale and low pass filter the acceleration vector input data and to generate an output variable called dash x. Although the C level code in FIG. 10 also generates an output variable dash y, this dash y variable is not used in the preferred embodiment. In alternative embodiments however, it may be used to control vertical scrolling of the dashboard, rear view mirror and sidepost to simulate the changing perspective as the car accelerates and decelerates in a straight-ahead fashion.

Figure 11:
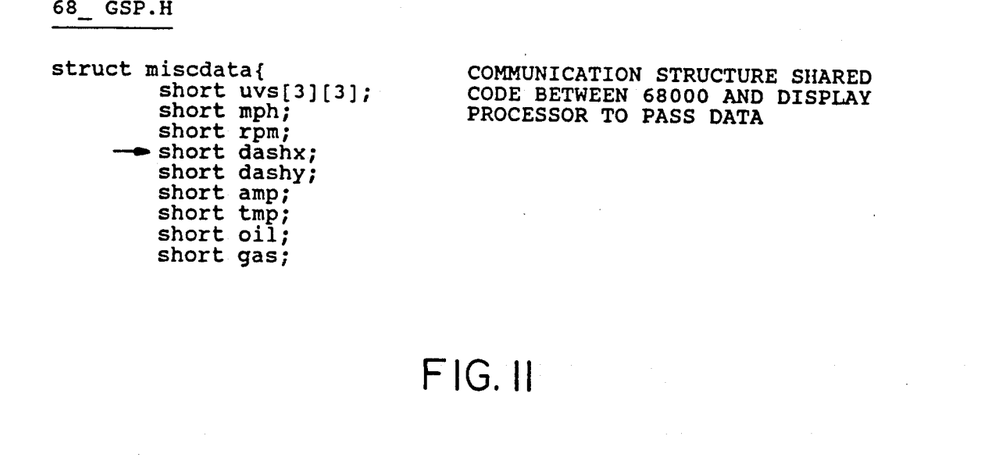
FIG. 11 is the C language communication structure to pass data between the 68000 and the display processor.

The scaling and low pass filtering function of the code in FIG. 10 is symbolized by blocks 134 and 136 in Section B of FIG. 7. The model.H shared C language communication structure represented by the code of FIG. 9 is symbolized by block 138 in FIG. 7. The purpose of the scaling function represented by block 134 in FIG. 7 is to implement the spring constant of the spring 74 in FIG. 4. The purpose of the low pass filter operation represented by block 136 is to implement the action of the dashpot 76 in filtering out high frequency components. This avoids a jittery dash movement which would otherwise result by virtue of the updating of the acceleration vector every 30 miliseconds. Note that the coordinate system 30 used by the 68,000 master processor and doing its function is changed from the coordinate system used by the model processor. In alternative embodiments, both coordinate systems can be the same. After the acceleration vector data from the model processor has been scaled and low pass filtered in the master processor, the value of the variable dash x is passed to the display processor 82 in FIG. 5 via the communication structure 68 GSP.H symbolized by block 140 in FIG. 7. Block 140 represents the shared code given in FIG. 11. This code is shared between the 68,000 master processor and the display processor to allow data to be passed between these two processors. The relevant field for the preferred embodiment of the invention is defined by the line pointed to by the arrow in FIG. 11. This field contains the data for the dash x variable represented by information transfer line 142 in FIG. 7. This data represents the amount by which the dash is to be moved by virtue of the current acceleration vector.

Figure 12:
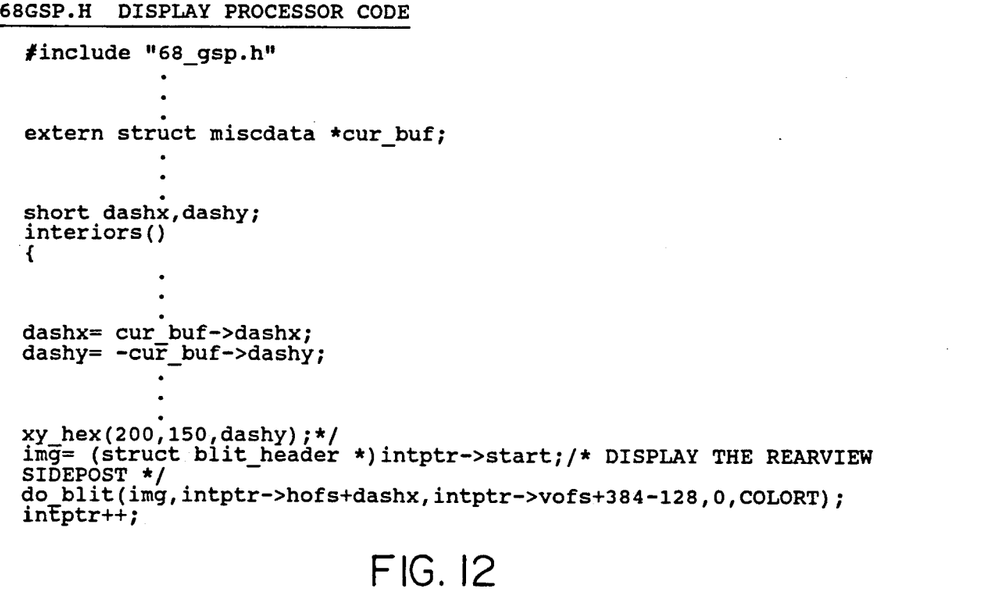
FIG. 12 is the C language code run by the display processor which calculates the position at which to paint the representations of the rear view mirror and the sidepost in the middle segments of the display.

Referring to FIG. 12, there is shown the code of the 68 GSP.H file run by the display processor which calculates the position at which to paint the representations of the rear view mirror and the sidepost in the middle segment of the display. This code pulls the parameter dash x out of the communication structure for use in calculating the locations of the mirror and sidepost so that their locations and movements may be synchronized with the location and movements of the dashboard. The calculations performed by the code of FIG. 12 are done within a routine called "interiors" and are symbolized by block 144 in FIG. 7.

Figure 13:
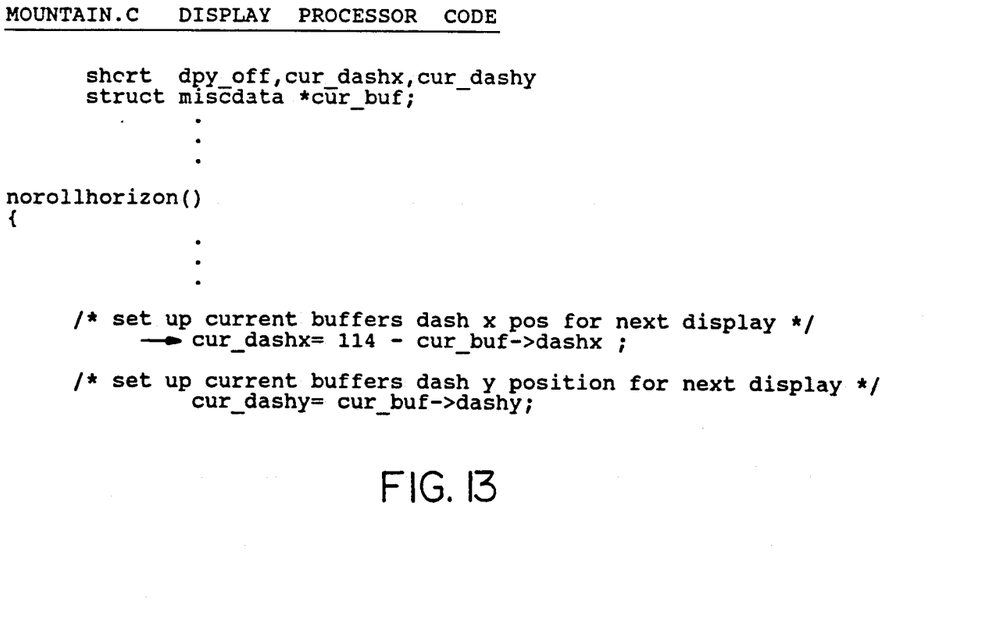
FIG. 13 is the C language code run by the display processor to calculate a variable curdashx which defines where the left edge of the dash is to appear.

Referring to FIG. 13, there is shown the code in a file called mountain.C which is run by the display processor to calculate a variable called curdashx which defines where the left edge of the dash portion of the screen display is to start. This calculation is made in a routine called norollhorizon. The key calculation is the line of code pointed to by the arrow in FIG. 13. The constant 114 is used as an offset so that the displayed dashboard will be centered when the dash x variable indicates no acceleration vector is acting on the driver's head. The code of FIG. 13 is represented by the block 146 in FIG. 7.

Figure 14:
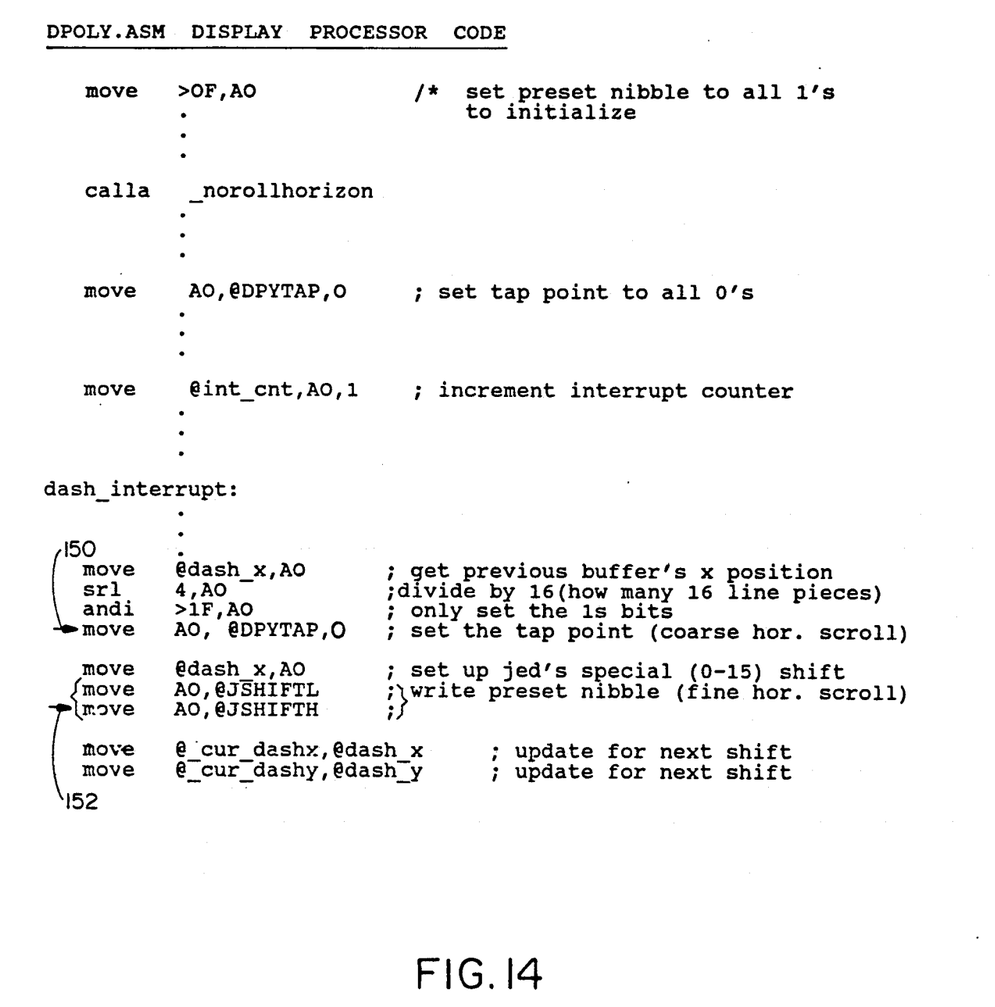
FIG. 14 is the C language code run by the display processor to call the norollhorizon routine to obtain the calculated value for the desired positon of the dash and then performs the coarse and fine horizontal scrolling function by outputting the appropriate data to the DPY-TAP register in the display processor and the preset nibble to the pixel scanning circuit.

Referring to FIG. 14, there is shown the code in a file called DPOLY.ASM. This code is run by the display processor and serves to call the norollhorizon routine to obtain the calculated value for the desired position of the dash and then performs the coarse and fine horizontal scrolling function by sending the appropriate data bits to the DPYTAP register in the display processor and the preset nibble on bus 102 to the pixel scanning circuit 96 in FIG. 5. The code which sets the coarse horizontal scrolling register contents is pointed to by arrow 150 and the code which writes the appropriate preset nibble on bus 102 is pointed to by arrow 152. The operation of this code is symbolized by block 154 in FIG. 7.

Although the invention has been described in terms of the preferred and alternative embodiments described herein, those skilled in the art will appreciate other modifications which may be made to the teachings herein without departing from the spirit and scope of the invention. All such modifications are intended to be included within the scope of the claims appended hereto.

What is claimed is:

1. An apparatus for scrolling a video display of a dashboard of a simulated vehicle driven by a driver to simulate the perspective change when a vehicle operator's head moves in a real vehicle relative to that vehicle under the influence of an acceleration vector acting on the operator's head, comprising:

first means for receiving said driver's control inputs and calculating a simulated resultant acceleration vector which would act on said simulated vehicle and said driver's head if said simulated vehicle were real and was responding to said control inputs;

second means for scaling said simulated resultant acceleration vector to simulate the neck and body compliance of said driver acting to resist movement of the said driver's head in response to said simulated resultant acceleration vector and for calculating the value of a shift variable which is indicative of the amount of apparent approximate shift in the position of the dashboard said drive would see in a real vehicle actually responding to said control inputs if they were real;

third means for displaying a dashboard of a simulated vehicle on a video display and scrolling the position of said dashboard on said video display in response to the value of said shift variable.

2. The apparatus of claim 1 wherein said first means repeatedly evaluates said control inputs from said dirver and, in response to each evaluation, calculates a new resultant acceleration vector, and wherein variable each time a new resultant acceleration vector is calculated, and wherein said third means scrolls the displayed dashboard to a new position on said video display in response to each new value for said shift variable.

3. The apparatus of claim 1 wherein said third means displays a simulated scene visible out said widnscreen in three segments on a video display, said three segments including a fixed horizon segment, a changing middle segment where polygons are drawn repeatedly to represent the changing scene outside said simulated vehicle as said vehicle moves through a simulated universe, said polygons including a depiction of a rear view mirror, a sidepost on a windshield and a simulated dashboard.

4. The apparatus of claim 3 wherein said third means includes means for displaying said rear view mirror and said sidepost at a location in said middle segment that corresponds to the current position of said displayed dashboard.

5. An apparatus for scrolling a video displayed control panel to simulate changing perspective to the operator of a simulated vehicle in response to a simulated acceleration vector, comprising:

means for calculating data representing the simulated acceleration acting on the vehicle and data representing the resulting apparent perspective of the control panel to the operator of the vehicle which would result from said simulated acceleration; and means including a display for displaying said control panel in a position on said display which simulates said apparent perspective.

6. The apparatus of claim 5 wherein said means for calculating includes means for receiving control inputs from an operator of said simulated vehicle and calculating said simulated acceleration therefrom.

7. The apparatus of claim 6 wherein said means for calculating includes means for scaling said simulated acceleration data to simulate the compliance of the operator's neck and body to the forces acting on said operator's head resulting from said simulated accelerations.

8. The apparatus of claim 7 wherein said means for calculating includes means for repeatedly evaluating acceleration data and further includes means for smoothing out the changes in said data representing said apparent perspective in response to changes in said data representing said simulated acceleration.

9. The apparatus of claim 8 wherein said means for displaying comprises:

a video random access memory means for storing video data;

shift register means comprising a plurality of shift registers coupled to said memory means for receiving video data from said memory means and shifting said video data out serially for display;

display processor means coupled to said memory means for selecting a raster line of video data in said memory means and loading it into said shift register means and for receiving data regarding the required amount of scrolling of said control panel and for calculating scrolling data and for generating a blank signal which enters an active state at the start of each new raster line;

selection means coupled to receive said blank signal and said scrolling data and coupled so as to be able to enable individual ones of said shift registers, for enabling a selected one or more of said shift registers sequentially during each raster line to cause the video data for each raster line to be shifted out for display of the raster line, the enabling of said shift registers being times in accordance with said blank signal and said scrolling data such that the control panel is displayed in the correct position on said display to simulate the perspective change.

10. The apparatus of claim 9 wherein said display processor means calculates both coarse and fine scrolling data, and wherein said display processor uses said coarse scrolling data to position the display of said control panel within a first predetermined number of pixels and wherein said fine scrolling data positions the display of said control panel within a window set by said coarse scrolling data having a width equal to said first predetermined number of pixels to within a resolution of a second predetermined number of pixels less than said first predetermined number of pixels.

11. A method of simulating the perspective change seen by an operator of a vehicle comprising the steps of:
repeatedly evaluating operator inputs for controlling a simulated vehicle;
calculating data representing a simulated acceleration vector acting on said simulated vehicle in response to said operator inputs each time said operator inputs are evaluated;
scaling said data to represent the compliance of said operator's body to movement of the operator's head under the influence of said simulated acceleration vector;
displaying a control panel on a video display in a position to simulate the apparent shiftin in perspective of the position of said control panel relative to an outside scene in response to movement of said operator's head and scrolling the position of said displayed control panel to new positions on said display in response to changes in said data representing said acceleration vector.

12. The method of claim 11 wherein said step of displaying a control panel includes the steps of calculating from said scaled data scrolling data and using said scrolling data to control the timing of output of video data defining the appearance of said control panel on said display to implement the required amount of shifting of the displayed position of said control panel to simulate the perspective change which would be seen by the operator of a real vehicle operating under similar circumstances.

13. A method of displaying a control panel of a vehicle on a video display and shifting the displayed position of said control panel to simulate perspective change to the operator of said vehicle comprising the steps of:
reading control inputs from said operator indicating desired movements of said simulated vehicle and calculating therefrom data indicating the position at which to display said control panel taking into account the forces acting on the operator's head and the compliance of the operator's body resisting movement of the operator's head; and
using said data to control the output of video data defining the appearance of said control panel such that said control panel appears in the proper place on said display to simulate the perspective which would be seen by said operator.

14. The method of claim 13 wherein said using step includes the step of using said data to control the timing of retrieval and display of video data from a video bit map such that said control panel is displayed in the appropriate location on said display.

15. An apparatus for displaying a shifting control panel of a simulated vehicle on a video display comprising:
means for reading inputs from an operator indicating disired movements of said simulated vehicle and calculating therefrom data indicating the position at which to display said control panel taking into account the forces acting on the operator's head and the compliance of the operator's body resisting movement of the operator's head; and
means for using said data to control the output of video data defining the appearance of said control panel such that said control panel appears in the proper place on said display to simulate the perspective which would be seen by said operator.

16. The apparatus of claim 15 wherein said means for using said data includes means for using data to control the timing of retrieval and display of video data from a video bit map such that said control panel is displayed in the appropriate location on said display.

* * * * *

UNITED STATES PATENT AND TRADEMARK OFFICE
CERTIFICATE OF CORRECTION

PATENT NO.   :   5,005,148
DATED        :   April 2, 1991
INVENTOR(S)  :   Max L. Behensky, et al.

It is certified that error appears in the above-identified patent and that said Letters Patent is hereby corrected as shown below:

Column 1, line 58, please insert --FIG. 9 is the high level C language communication structure for communication of data between model processor 20 in FIG. 1 and the 68,000 master processor 32 in FIG. 1.--.

Column 1, line 58, please insert --FIG. 10 is the C language code which is run by the 68,000 to process the acceleration vector input data from the model processor.--.

Column 4, line 14, delete "rafter" and insert --raster--.

Column 5, line 34, delete "car,s" and insert --car's--.

Column 6, line 38, delete "30".

Column 6, lines 46 and 58, underline "GSP.H".

Column 7, line 3, underline "curdashx".

UNITED STATES PATENT AND TRADEMARK OFFICE
CERTIFICATE OF CORRECTION

PATENT NO.   :   5,005,148
DATED        :   April 2, 1991
INVENTOR(S)  :   Max L. Behensky, et al.

It is certified that error appears in the above-identified patent and that said Letters Patent is hereby corrected as shown below:

Column 8, line 4, Claim 3, delete "widnscreen" and insert --windscreen--.

Column 8, line 40, Claim 8, after "evaluating" insert --said control inputs and calculating said simulated--.

Column 10, line 28, Claim 15, delete "disired" and insert --desired--.

Signed and Sealed this

Twenty-fifth Day of August, 1992

*Attest:*

DOUGLAS B. COMER

*Attesting Officer*   Acting Commissioner of Patents and Trademarks